United States Patent
Theiss et al.

(10) Patent No.: US 7,113,856 B2
(45) Date of Patent: Sep. 26, 2006

(54) METHOD FOR THE CLASSIFICATION OF AN OCCUPANCY STATUS OF A VEHICLE SEAT

(75) Inventors: Christian Theiss, Sankt Vith Recht (BE); Marc Schifflers, Lontzen (BE); Patrick Di Mario Cola, Fontoy (BE)

(73) Assignee: IEE International Electronics & Engineering S.A., Echternach (LU)

( * ) Notice: Subject to any disclaimer, the term of this patent is extended or adjusted under 35 U.S.C. 154(b) by 0 days.

(21) Appl. No.: 10/487,045

(22) PCT Filed: Jul. 20, 2002

(86) PCT No.: PCT/EP02/08108

§ 371 (c)(1),
(2), (4) Date: Jul. 1, 2004

(87) PCT Pub. No.: WO03/016100

PCT Pub. Date: Feb. 27, 2003

(65) Prior Publication Data

US 2004/0231906 A1 Nov. 25, 2004

(30) Foreign Application Priority Data

Aug. 17, 2001 (LU) ................................................. 90820
Aug. 23, 2001 (LU) ................................................. 90821

(51) Int. Cl.
| | |
|---|---|
| *G05D 1/00* | (2006.01) |
| *B60R 21/32* | (2006.01) |
| *B60R 16/00* | (2006.01) |
| *B60R 21/01* | (2006.01) |
| *B60K 28/04* | (2006.01) |

(52) U.S. Cl. ........................... 701/45; 701/46; 280/735; 180/271; 180/273; 307/10.1; 702/127

(58) Field of Classification Search ............. 701/45–46; 280/730.1, 727; 180/271, 273; 307/10.01; 702/127; 340/436, 438
See application file for complete search history.

(56) References Cited

U.S. PATENT DOCUMENTS

| 5,474,327 A | * | 12/1995 | Schousek ..................... 280/735 |
| 5,482,314 A | * | 1/1996 | Corrado et al. ............. 280/735 |
| 5,732,375 A | * | 3/1998 | Cashler ....................... 701/45 |

(Continued)

FOREIGN PATENT DOCUMENTS

| DE | 19625730 A | * | 1/1998 |
| EP | 0721863 A | * | 7/1996 |
| FR | 2744548 A | * | 8/1997 |

(Continued)

OTHER PUBLICATIONS

Gillis et al., The use of signal processing techniques in an occupant detection system, SAE technical paper series 940906, SAE International, Warrendale, PA., pp. 65–70.*

(Continued)

*Primary Examiner*—Cuong Nguyen
(74) *Attorney, Agent, or Firm*—McCormick, Paulding & Huber LLP

(57) ABSTRACT

A method for classifying an occupancy status of a vehicle seat includes associating a filtered class to a specific seat occupancy status based on a plurality of successive readings of at least one parameter value of a seat occupancy sensor, including the steps of: 1) determining an actual value of a first parameter of the seat sensor and associating an actual class to the actual value of the first parameter; 2) storing the actual class in a buffer, and deleting the oldest stored class; 3) plotting a confidence parameter indicative of the reliability of the actual class; 4) setting an updated filtered class to equal (i) an average of the classes stored in the buffer, if the confidence parameter is smaller than a first confidence threshold value, or (ii) the previously determined filter class, if the confidence parameter is greater than or equal to the first confidence threshold value.

22 Claims, 5 Drawing Sheets

U.S. PATENT DOCUMENTS

| | | | |
|---|---|---|---|
| 5,890,035 A * | 3/1999 | Kumar et al. | 399/115 |
| 5,890,085 A * | 3/1999 | Corrado et al. | 701/47 |
| 6,012,007 A * | 1/2000 | Fortune et al. | 701/45 |
| 6,026,340 A * | 2/2000 | Corrado et al. | 701/47 |
| 6,459,974 B1 * | 10/2002 | Baloch et al. | 701/45 |
| 2003/0040858 A1 * | 2/2003 | Wallace | |
| 2004/0045758 A1 * | 3/2004 | Breed et al. | |
| 2004/0153229 A1 * | 8/2004 | Gokturk et al. | |
| 2005/0015188 A1 * | 1/2005 | Schifflers et al. | |

FOREIGN PATENT DOCUMENTS

| | | | |
|---|---|---|---|
| LU | 90820 | * | 8/2001 |
| LU | 90821 | * | 8/2001 |
| LU | 90830 | * | 9/2001 |
| WO | WO 9728989 A | * | 8/1997 |
| WO | WO 9938731 A1 | * | 8/1999 |
| WO | WO 99/38731 | | 8/1999 |
| WO | WO 01/18506 | | 3/2001 |
| WO | WO 01/85497 | | 11/2001 |
| WO | WO 03016100 A1 | * | 2/2003 |

OTHER PUBLICATIONS

Gilles et al., Occupant position sensing systems: functional requirements and technical means, SAE technical paper series 932915, Worldwide Passenger Car Conf. & Expo., Dearborn MI Oct. 25–27, 1993.*

Fukinaga et al., Non–parametric discriminant analysis, IEEE Transactions, vol. PAMI–5, Nov. 6, No. 1983, pp. 671–678.*

16–step range finder IC H2476–01, Hamatsu Technical Data, Jan. 1990 (3 pages).*

K. Billen, et al; Occupant Classification System for Smart Restraint Systems; Society of Automotive Engineers Paper, 1999–01–0761; Jan. 1999; pp. 33–38.

* cited by examiner

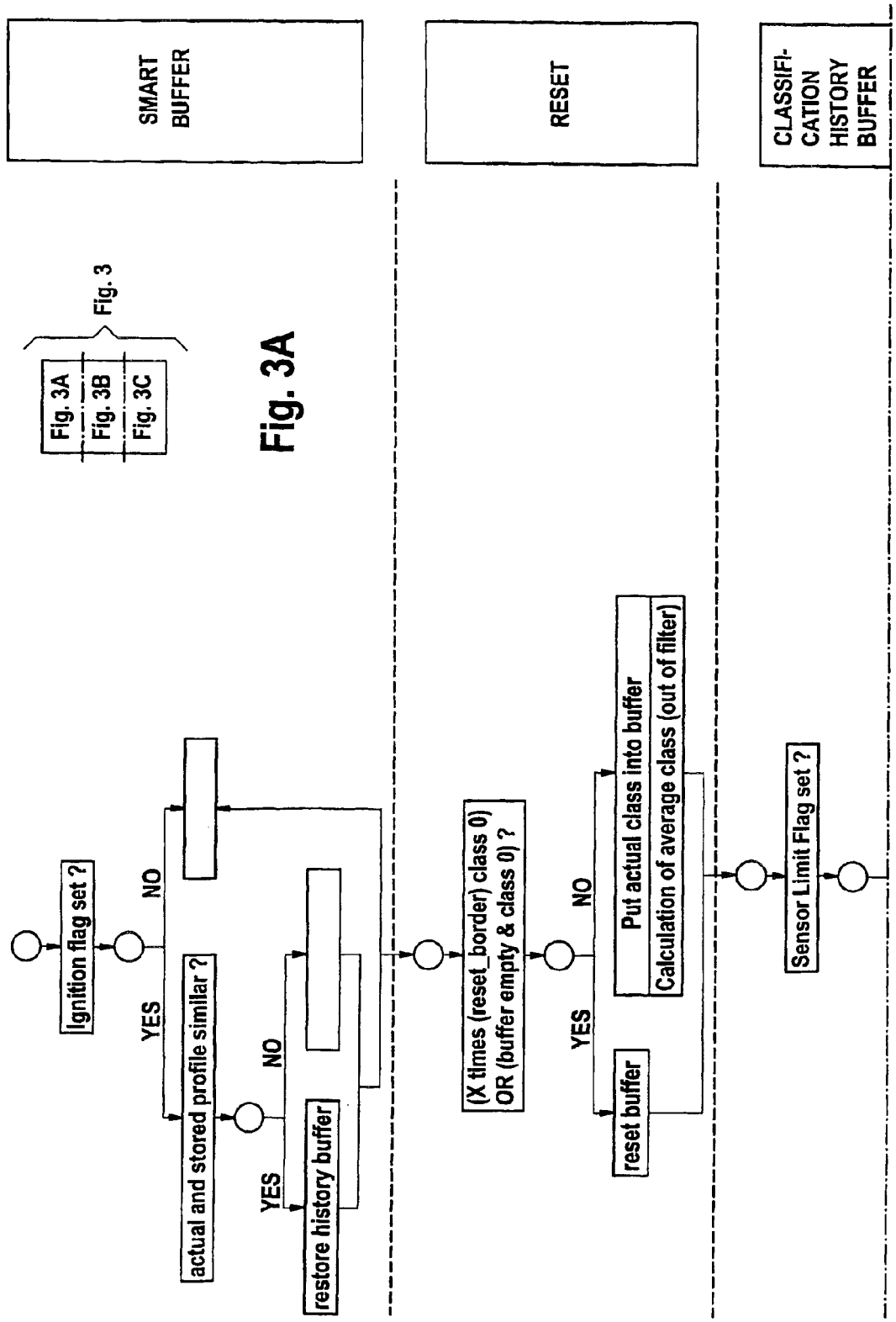

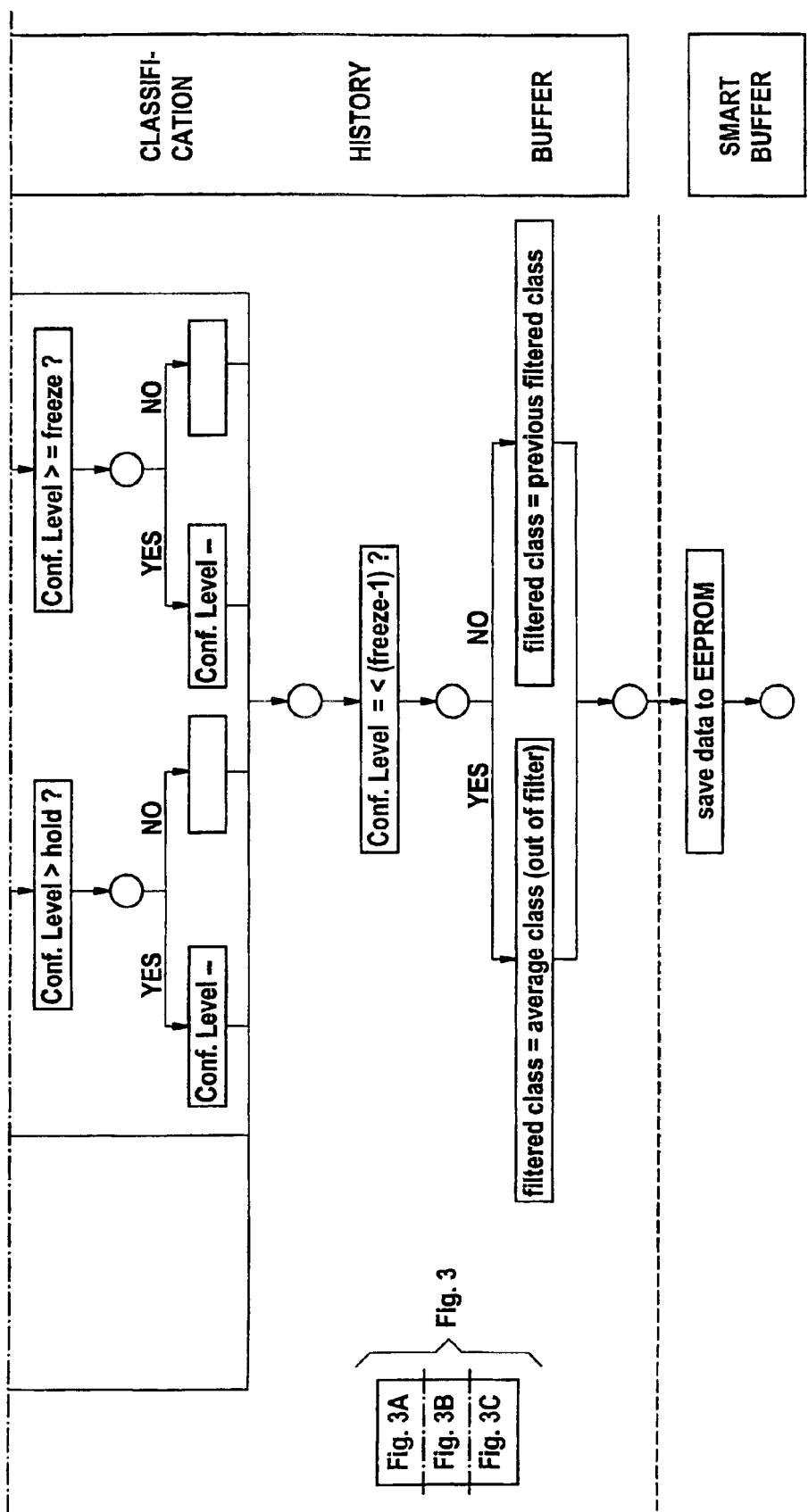

METHOD FOR THE CLASSIFICATION OF AN OCCUPANCY STATUS OF A VEHICLE SEAT

CROSS-REFERENCE TO RELATED APPLICATIONS

This application is entitled to the benefit of and incorporates by reference in their entireties essential subject matter disclosed in International Application No. PCT/EP02/08108 filed on Jul. 20, 2002 and Luxembourg Patent Application No. 90 820 filed on Aug. 17, 2001.

FIELD OF THE INVENTION

This invention generally relates to automotive occupancy sensor systems and methods of operation to determine the presence and/or the position of an object or a passenger in a seat, and to classify it by type or nature in order to provide an occupancy state or condition signal for use with a safety restraint system control. The present invention more specifically relates to a method for the classification of an occupancy status of a vehicle seat based on several parameters relating to an occupation status of a vehicle seat.

BACKGROUND OF THE INVENTION

In order to protect the lives of passengers during a traffic accident, modern vehicles are generally fitted with a protection system comprising several airbags and seat belt pretensioners, which are used to absorb the energy of a passenger released during the collision due to the accident. It is clear that such systems are even more effective when they are better adapted to the specific requirements of each passenger, i.e. to the weight and/or the size of the passenger. That is why microprocessor-controlled protection systems have been designed which provide several operational modes, allowing for example an adaptation of the instant at which airbags are deployed, the volume to which the airbags are inflated, the instant at which safety belts are released after the collision, etc, as a function of the stature of the passenger and the orientation of the passenger on the seat.

In order to enable the control microprocessor to select the optimum operational mode for a given seat occupancy status, it is therefore necessary to detect one or several parameters characterizing the occupancy status of the seat and to classify the occupancy into one of several classes, each of which is associated to a specific operational mode of the restraint system.

The detection of the occupancy parameters is commonly achieved by seat occupancy sensors, which comprise a plurality of pressure sensors distributed over the surface of the seat. The pressure sensors comprise pressure sensitive resistors, i.e. the resistance of these pressure sensors changes with the pressure applied on the sensor. The reading of the resistance values of the individual pressure sensors thus gives an indication on the pressure acting on each cell and accordingly can be related to the weight acting on the seat. Furthermore the distribution of the pressure values over the surface of the seat can be related to the size or the form of a person or an object occupying the seat.

In a very simple method for controlling the restraint system, the occupancy status is repeatedly monitored by means of one or more specific parameters of the occupancy detector, and an actual occupancy class is associated to the measured parameter. This actual occupancy class is then directly used by the microprocessor for selecting the adequate operational mode of the restraint system. Unfortunately a passenger often changes its position on the seat, thereby shifting its weight respectively its center of weight. Each movement will change the readings on the different pressure sensors so that the classification may vary arbitrarily with time.

In order to dampen the arbitrary variations of the classification, the actual class parameter can be stored into a buffer comprising several previously determined classes and a filtered class can be set to the average value of the individual stored classes. While such a filtering provides an improved classification result, this method is still not reliable enough. In fact, a single bad classification among a series of reliable classifications immediately may have an impact on the filtered class of the passenger.

OBJECTS AND SUMMARY OF THE INVENTION

The object of the present invention is to provide an improved method for the classification of an occupancy status of a vehicle seat.

DETAILED DESCRIPTION OF THE PREFERRED EMBODIMENT

In order to overcome the above-mentioned problems, the present invention provides a method for the classification of an occupancy status of a vehicle seat, wherein a filtered class is associated to a specific seat occupancy status based on a plurality of successive readings of at least one parameter value of a seat occupancy sensor. This method comprises the steps of:

a. determining an actual value of a first parameter of said seat occupancy sensor and associating an actual class to said actual value of said first parameter,
b. storing said actual class in a buffer comprising several previously determined classes;
c. plotting a confidence parameter, said confidence parameter being indicative of the reliability of the actual class; and
d. setting an updated filtered class to equal
   i) an average of the classes stored in said buffer, if said confidence parameter is smaller than a first confidence threshold value; and
   ii) said previously determined filtered class, if said confidence parameter is greater than said first confidence threshold value.

The confidence parameter of the present invention is preferably indicative of the constancy of the classifications over time. Thus if the variation between consecutive classifications is very small, the confidence parameter increases. On the other hand, if the variation between consecutive classifications is considerable, the confidence parameter will decrease. The advantage of the present method is, that after a series of identical classifications, the confidence level has reached a value which is far above the first confidence threshold value, such that a misclassification due to a movement of a passenger, is not at all considered in the filtered class. The misclassification will only affect the confidence value, which will be decreased by one.

It follows, that once a good and reliable classification of the present occupancy status is achieved due to a series of similar actual classifications, such reliable classification will not immediately change in case of several bad classifications.

Only when the occupancy status has permanently changed, i.e. after a series of different classifications, the confidence value will take a value below the first threshold.

In this case, the values of the recently determined classes, which are stored in the buffer, will be used for calculating an updated filtered class.

It should be noted, that a buffer can only store a limited number of subsequently determined classes. Thus, once the buffer is full, the oldest stored class of said buffer is preferably deleted in step b.

In a preferred embodiment of the method, especially of step d., said updated filtered class is set to equal said previously determined filtered class, if said confidence parameter is equal to said first confidence threshold value.

In order to adapt the confidence parameter to the actual situation said confidence parameter is preferably decreased if said actual class differs from a previously determined filtered class. Furthermore said confidence parameter is preferably increased if said actual class corresponds to said previously determined filtered class.

In a preferred embodiment, the method further comprises the step of determining an actual value of a second parameter of said seat occupancy sensor, said second parameter being indicative of the quality of the first parameter, and, if said second parameter is smaller than a predetermined quality threshold value, a. increasing said confidence parameter, if said confidence parameter is smaller than said first confidence threshold, and
b. decreasing said confidence parameter, if said confidence parameter is greater than said first confidence threshold.

The second parameter is e.g. indicative of a profile quality, whereby a good pressure profile is characterized by a specific distribution of the activated pressure sensors and their respective resistance values over the surface of the seat. In fact, a regular an symmetric distribution of the activated cells is indicative of a better profile than an irregular and asymmetric distribution. If for a series of loops the quality of the detected profile is not considered sufficient, i.e. if said second parameter is smaller than a predetermined quality threshold value, while the actual class is nevertheless equal to the filtered class, the confidence parameter is step by step brought to the value of the first confidence threshold. On the other hand, if said second parameter is greater than said predetermined quality threshold value, said confidence parameter is increased if said actual class corresponds to said previously determined filtered class.

In a further preferred embodiment, the method further comprises the step of setting a first flag if a parameter value of said seat occupancy sensor indicates a non-human occupancy and, if said first flag is set, a. increasing said confidence parameter, if said confidence parameter is smaller than a second confidence threshold value, said second threshold value being greater than said first threshold value, and
b. decreasing said confidence parameter, if said confidence parameter is greater than said second confidence threshold.

The first flag can e.g. be set if the distribution of the activated sensor cells is concentrated on the lateral regions of the seat. Such a distribution is typical for a child seat.

In order to prevent a misclassification due to an out of center position of a passenger, the method preferably comprises the further step of setting a second flag if a parameter value of said seat occupancy sensor indicates that said occupancy partially occurs outside an active sensor area, and, if said second flag is set, decreasing said confidence parameter if said confidence parameter is greater than said second confidence threshold.

It should be noted, that said first parameter is preferably indicative of the weight of a passenger or an object occupying said seat. Alternatively said first parameter is indicative of the width of the contact surface of a passenger or an object, occupying said seat.

Since the execution of the above described steps is only useful when the seat is actually occupied, the method preferably further comprises the step of setting a third flag indicative of an occupancy of the seat, wherein said steps a. to d. are executed only if said third flag is set.

BRIEF DESCRIPTION OF THE DRAWINGS

The present invention will be more apparent from the following description of a not limiting embodiment with reference to the attached drawings, wherein.

DETAILED DESCRIPTION OF THE INVENTION

Figure 1:
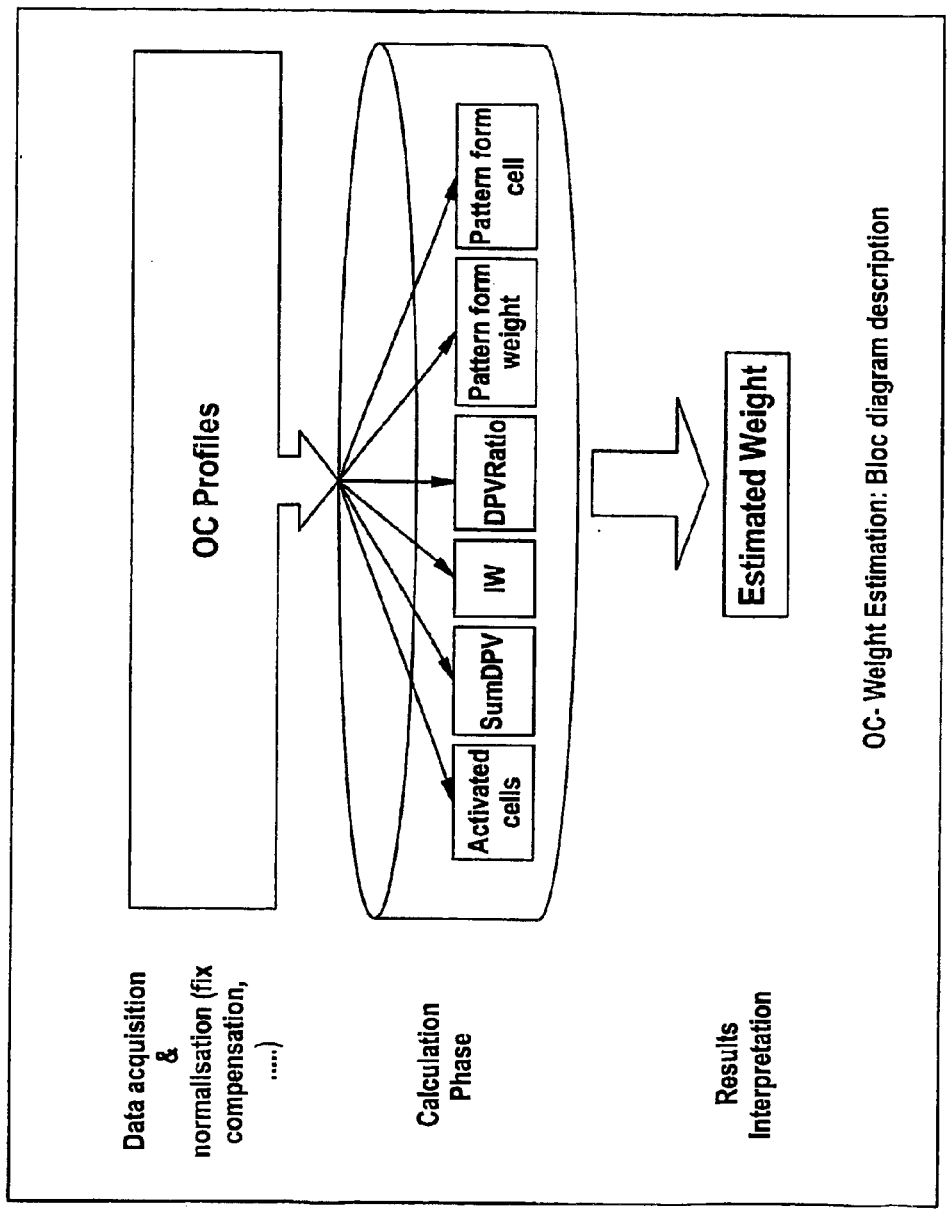
FIG. 1: shows a bloc diagram of a weight estimation module.

The described method is based on a weight estimation of a passenger. Such weight estimation is e.g. based on several parameters (see FIG. 1) such as (2) anthropometric parameters: (IW, DPVratio)
(2) parameters based on absolute force: (SumTDPV, Activated Cells)
(2) form recognition parameters: (Pattern Recognition (form and size))

The final classification status is the result of the estimation of the occupant's weight resulting from analysis of several characteristics content in pressure profiles taken by pressure sensitive seat sensors.

Only a part of classifiers used in the algorithm are applicable to the non-human occupancies. In order to quickly discriminate child restraint systems, the so-called class_1_flag is preferably used and it overrides the weight estimation module.

The seat occupied flag (SOflag) is preferably set when the seat is occupied, not affected by pre-load. The classification module gathers the results from the weight estimation module, class_1_flag and SOFlag and yields a real-time class final decision.

Figure 2:
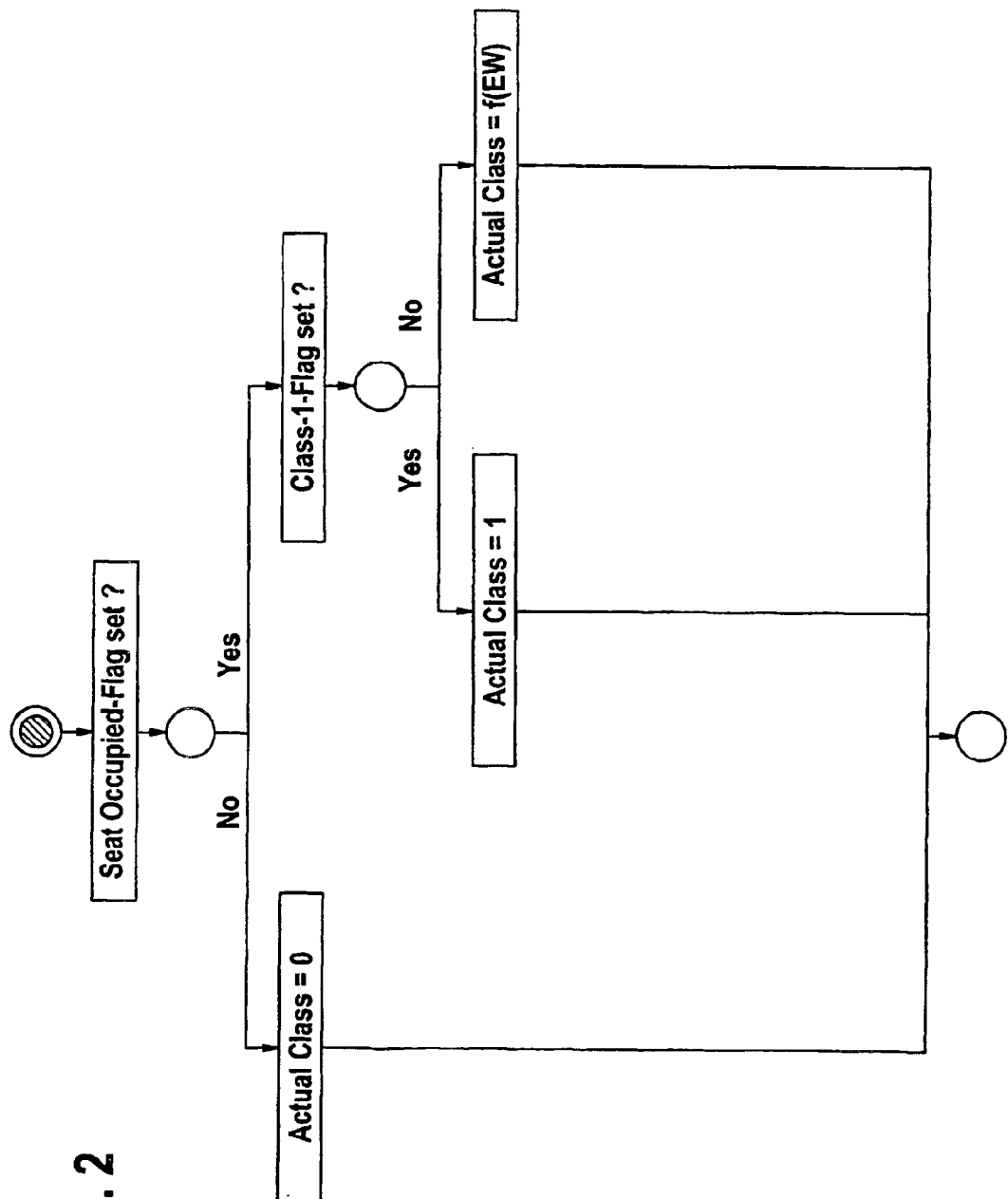
FIG. 2: shows a block diagram illustrating the use of several flags in the overall method.

FIG. 2 shows a block diagram illustrating the use of several flags in the overall method.

The Class_1_Flag is set for 'non human' profiles or very small children profiles. It takes into account the number of activated cells, the number of activated rows, the size of the compact of non-activation area in the profile, the degree of unlikeness of the profile with reference human profiles and the profile geometry (horizontal and vertical straight lines).

The 'seat occupied flag' (SOFlag) is set when a given amount of cells is activated, preload is not recognized as a occupied state of the seat.

The profile quality module gives an output depending on the symmetry, the position, the compactness and the presence of legs of actual profile.

The sensor_limits_flag is set when the actual profile is detected to be in vicinity of the front or side bolsters of the seat, suggesting a possible truncation of the real profile, so that is no more possible to provide a reliable classification.

The classification module takes into account the seat occupied flag, the class 1 flag and the weight estimation according to FIG. 2.

The buffer yields a stable, the most probable (high confidence level) class by considering the actual profile class, the profile quality, the sensor limits flag, the class 1 flag, the ignition switch and the classification history (FIFO buffer).

When the profile quality falls too low or the sensor limits flag is set, the class of the last good profile (if there was one) is kept as final class decision. Otherwise the average classification status from the FIFO buffer is used.

When the ignition switch is turned off, the system stores the last profile and the buffer parameters (FIFO buffer, last good profile and class, . . . ) in a non-volatile memory. When ignition is turned on again, the smart buffer compares the last stored profile with the first incoming profile. If the likeness of those profiles is high, the system starts up with the stored buffer parameters.

The aim of the classify module is to output the class of the actually analyzed profile according to the values of the SOflag, the class__1__flag and the estimated_weight. The module is specific to the classification logic.

If the SOflag is not set, set the class to 0, else if the class__1__flag is set, set the class to 1, else set the class according to the estimated_weight and the given class borders.

Figure 3B:
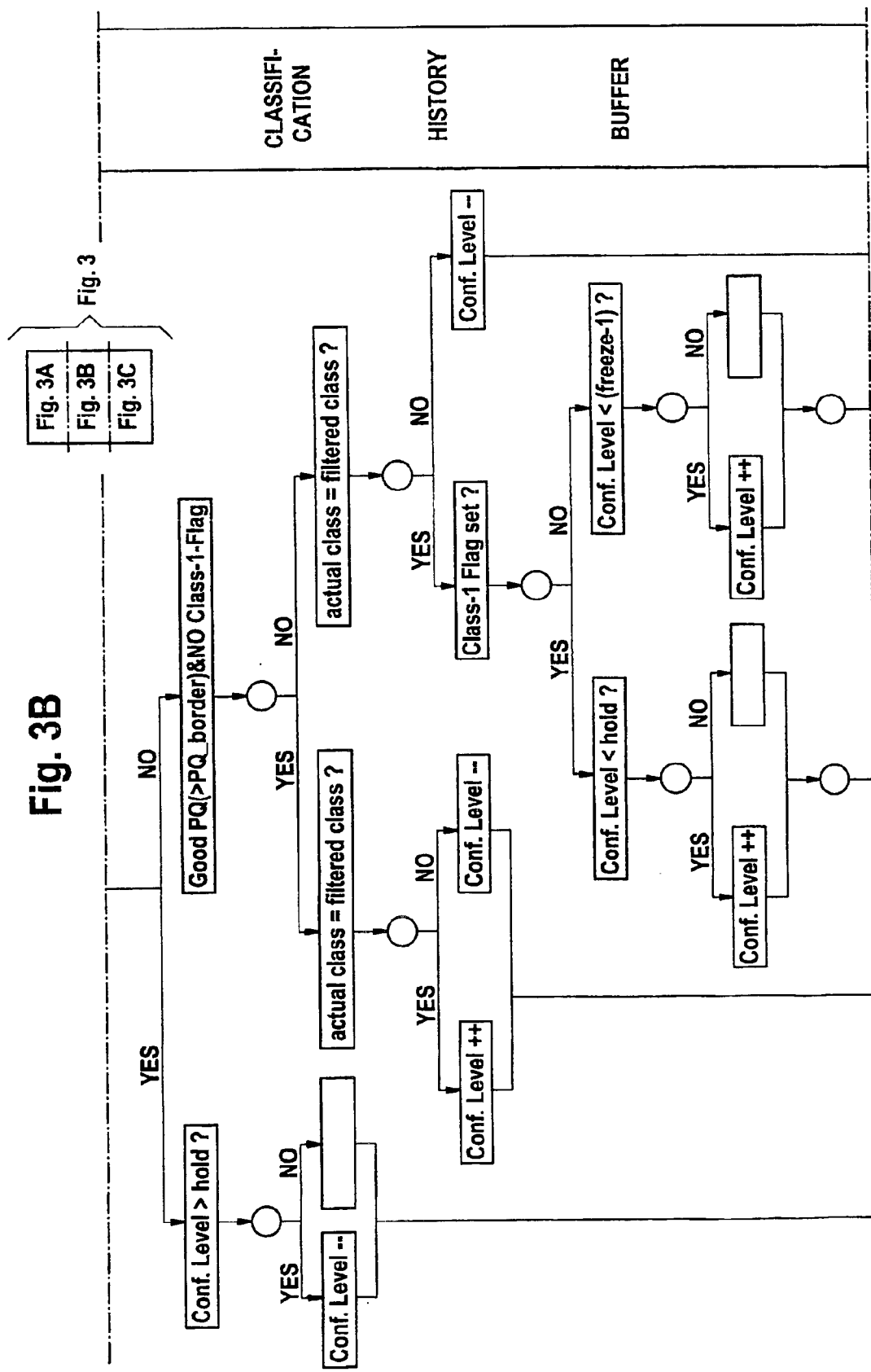
FIG. 3: shows a flowchart of the algorithm of a preferred embodiment of the present method.

FIG. 3 shows a flowchart of an embodiment of a method according to the present invention which can be used in the buffer module of an airbag control system.

The aim of the buffer module is to give the final classification and confidence level in function of the classification history and the characteristics of the actual profile. A classification that was assumed as good and reliable should be frozen when the incoming profile doesn't allow a reliable classification (low profile quality or bad sitting position).

The smart buffer part of this module should, after a system reset, restore the last stored buffer state before the reset if the actual profile has a high likeness with the last stored profile before the reset. This module is classification system specific.

Calculation Specification

The buffered_class can vary between 0 and the maximal class index.

The confidence_level can vary between min_conf_level and max_conf_level.

Initial Buffer State:
 history buffer empty (length=0)
 buffered_class=0
 confidence_level=0

Smart Buffer:
 The storage of the last data before power off has to be done by the electronics.
 The first time the algorithm runs after a system reset, the smart buffer algorithm has to be executed before the buffer is executed.

1. Compare the actual digitized pressure profile (as coming from the electronics) to the last stored digitized pressure profile (history_profile_DPV matrix) cell by cell before the system reset. Count the cells where the difference of digitized pressure value before/after system reset is smaller than the threshold (max_DPV_diff) given by the calibration.
2. If the counter from point 1 is greater than a threshold (max_cell_diff) given by the calibration, restore the history_buffer, the previous confidence level and buffered class, and all other variables that have to remain between each turn in the buffer algorithm.

Classification History Buffer:
1. Add the actual class to the history buffer. The buffer grows until it reaches max_buffer_depth. When this depth is reached, the oldest entry falls out of the buffer (FIFO).
2. Calculate the average of all classes stored in the history buffer, round the value to the nearest integer value. This value is called AvgClass.
3. Modify the buffered_class and the confidence_level according to the following decision tree (see flowchart):
4. Limit the variation (difference between actual and previous) between two consecutive values of buffered_class to +/−1 (actual buffered_class=previous buffered_class +/−1).
5. If there is a coherent sequence of 0 values in the history_buffer that has the length given by the reset condition given by the calibration, reset the history_buffer, the confidence_level and the buffered_class to their initial values.

What is claimed is:

1. A method for the classification of an occupancy status of a vehicle seat, wherein a filtered class is associated to a specific seat occupancy status based on a plurality of successive readings of at least one parameter value of a seat occupancy sensor, said method comprising the steps of:
 a. determining an actual value of a first parameter of said seat occupancy sensor and associating an actual class to said actual value of said first parameter,
 b. storing said actual class in a buffer comprising several previously determined classes;
 c. plotting a confidence parameter, said confidence parameter being indicative of the reliability of the actual class; and
 d. setting said filtered class to equal
  i) an average of the classes stored in said buffer, if said confidence parameter is smaller than a first confidence threshold value; and
  ii) a previously determined filtered class, if said confidence parameter is greater than said first confidence threshold value.

2. The method according to claims 1, wherein in said step d., said updated filtered class is set to equal said previously determined filtered class, if said confidence parameter is equal to said first confidence threshold value.

3. The method according to claim 1, wherein said confidence parameter is decreased if said actual class differs from a previously determined filtered class.

4. The method according to claim 1, wherein said confidence parameter is increased if said actual class corresponds to said previously determined filtered class.

5. The method according to claim 1, further comprising the step of determining an actual value of a second parameter of said seat occupancy sensor, said second parameter being indicative of the quality of the first parameter, and if said second parameter is smaller than a predetermined quality threshold value,
 a. increasing said confidence parameter, if said confidence parameter is smaller than said first confidence threshold, and
 b. decreasing said confidence parameter, if said confidence parameter is greater than said first confidence threshold.

6. The method according to claim 5, wherein, if said second parameter is greater than said predetermined quality threshold value, said confidence parameter is increased if said actual class corresponds to said previously determined filtered class.

7. The method according to claim 1, further comprising the step of setting a first flag if a parameter value of said seat occupancy sensor indicates a non-human occupancy and, if said first flag is set,
 a. increasing said confidence parameter, if said confidence parameter is smaller than a second confidence threshold value, said second threshold value being greater than said first threshold value, and b. decreasing said confidence parameter, if said confidence parameter is greater than said second confidence threshold.

8. The method according to claim 1, further comprising the step of setting a second flag if a parameter value of said seat occupancy sensor indicates that said occupancy partially occurs outside an active sensor area, and, if said second flag is set, decreasing said confidence parameter if said confidence parameter is greater than said second confidence threshold.

9. The method according to claim 1, wherein said first parameter is indicative of the weight of a passenger or an object occupying said seat.

10. The method according to claim 1, wherein said first parameter is indicative of the width of the contact surface of a passenger or an object occupying said seat.

11. The method according to claim 1, further comprising the step of setting a third flag indicative of an occupancy of the seat, wherein said steps a. to d. are executed only if said third flag is set.

12. A Method for the classification of an occupancy status of a vehicle seat, wherein a filtered class is associated to a specific seat occupancy status based on a plurality of successive readings of at least one parameter value of a seat occupancy sensor, said method comprising the steps of:

a. determining an actual value of a first parameter of said seat occupancy sensor and associating an actual class to said actual value of said first parameter, b. storing said actual class in a buffer comprising several previously determined classes;

c. plotting a confidence parameter, said confidence parameter being indicative of the reliability of the actual class; and d. setting an updated filtered class to equal
  i) an average of the classes stored in said buffer, if said confidence parameter is smaller than a first confidence threshold value; or
  ii) a previously determined filtered class, if said confidence parameter is greater than said first confidence threshold value.

13. The method according to claim 12, wherein in said step d., said updated filtered class is set to equal said previously determined filtered class, if said confidence parameter is equal to said first confidence threshold value.

14. The method according to claim 12, wherein said confidence parameter is decreased if said actual class differs from a previously determined filtered class.

15. The method according to claim 12, wherein said confidence parameter is increased if said actual class corresponds to said previously determined filtered class.

16. The method according to claim 12, further comprising the step of determining an actual value of a second parameter of said seat occupancy sensor, said second parameter being indicative of the quality of the first parameter, and, if said second parameter is smaller than a predetermined quality threshold value, a. increasing said confidence parameter, if said confidence parameter is smaller than said first confidence threshold, and b. decreasing said confidence parameter, if said confidence parameter is greater than said first confidence threshold.

17. The method according to claim 16, wherein, if said second parameter is greater than said predetermined quality threshold value, said confidence parameter is increased if said actual class corresponds to said previously determined filtered class.

18. The method according to claim 12, further comprising the step of setting a first flag if a parameter value of said seat occupancy sensor indicates a non-human occupancy and, if said first flag is set, a. increasing said confidence parameter, if said confidence parameter is smaller than a second confidence threshold value, said second threshold value being greater than said first threshold value, and b. decreasing said confidence parameter, if said confidence parameter is greater than said second confidence threshold.

19. The method according to claim 12, further comprising the step of setting a second flag if a parameter value of said seat occupancy sensor indicates that said occupancy partially occurs outside an active sensor area, and, if said second flag is set, decreasing said confidence parameter if said confidence parameter is greater than said second confidence threshold.

20. The method according to claim 12, wherein said first parameter is indicative of the weight of a passenger or an object occupying said seat.

21. The method according to claim 12, wherein said first parameter is indicative of the width of the contact surface of a passenger or an object occupying said seat.

22. The method according to claim 12, further comprising the step of setting a third flag indicative of an occupancy of the seat, wherein said steps a. to d. are executed only if said third flag is set.

* * * * *

UNITED STATES PATENT AND TRADEMARK OFFICE
CERTIFICATE OF CORRECTION

PATENT NO.         : 7,113,856 B2                                Page 1 of 1
APPLICATION NO.    : 10/487045
DATED              : September 26, 2006
INVENTOR(S)        : Christian Theiss et al.

It is certified that error appears in the above-identified patent and that said Letters Patent is hereby corrected as shown below:

Title Page (item 75) - Inventors
Line 3, after "Fontoy", please delete "(BE)" insert --(FR)--.

Signed and Sealed this

Twelfth Day of December, 2006

JON W. DUDAS
*Director of the United States Patent and Trademark Office*